(12) United States Patent
Krizan et al.

(10) Patent No.: US 11,044,441 B2
(45) Date of Patent: Jun. 22, 2021

(54) INTEGRATED AUDIO/VIDEO COLLABORATION SYSTEM FOR VIDEO CONFERENCE MEETINGS

(71) Applicant: HARMAN INTERNATIONAL INDUSTRIES, INCORPORATED, Stamford, CT (US)

(72) Inventors: Paul Krizan, Sachse, TX (US); Shaun Robinson, Dallas, TX (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 16/476,861

(22) PCT Filed: Jan. 13, 2017

(86) PCT No.: PCT/IB2017/050200
§ 371 (c)(1),
(2) Date: Jul. 9, 2019

(87) PCT Pub. No.: WO2018/130882
PCT Pub. Date: Jul. 19, 2018

(65) Prior Publication Data
US 2019/0364246 A1    Nov. 28, 2019

(51) Int. Cl.
*H04N 7/15* (2006.01)
*H04N 5/225* (2006.01)
*H04R 1/02* (2006.01)

(52) U.S. Cl.
CPC ............. *H04N 7/15* (2013.01); *H04N 5/2253* (2013.01); *H04R 1/028* (2013.01); *H04R 2499/15* (2013.01)

(58) Field of Classification Search
USPC ........................................ 455/416; 348/14.09
See application file for complete search history.

(56) References Cited

U.S. PATENT DOCUMENTS

| | | | |
|---|---|---|---|
| 6,300,979 B1 * | 10/2001 | Parkinson | F16M 11/08 248/187.1 |
| 9,179,097 B2 | 11/2015 | Kuscher et al. | |
| 2007/0091167 A1 | 4/2007 | Shiina et al. | |
| 2013/0106978 A1 | 5/2013 | Lam et al. | |
| 2013/0342637 A1 * | 12/2013 | Felkai | H04L 69/24 348/14.08 |
| 2014/0118403 A1 * | 5/2014 | Verthein | H04N 21/41415 345/660 |

(Continued)

FOREIGN PATENT DOCUMENTS

CN    103096020 B    1/2016

*Primary Examiner* — Maria El-Zoobi

(57) ABSTRACT

In one embodiment, the meeting device, comprising, a housing, a processor disposed in the housing, at least one presence detector disposed in the housing and coupled to an environment processor to detect presence within a predetermined distance of the meeting device, provides to the environment processor at least one presence detection signal based on the detected presence, wherein the processor turns on at least one meeting device component when the at least one presence detection signal is detected and at least one wireless transceiver coupled to the environment processor to provide at least one wireless signal.

20 Claims, 11 Drawing Sheets

(56) References Cited

U.S. PATENT DOCUMENTS

| | | | |
|---|---|---|---|
| 2014/0324962 A1* | 10/2014 | Lewin | H04L 67/141 |
| | | | 709/204 |
| 2015/0085060 A1* | 3/2015 | Fish | G06F 1/266 |
| | | | 348/14.03 |
| 2017/0139471 A1* | 5/2017 | Bury | G01J 1/44 |

* cited by examiner

INTEGRATED AUDIO/VIDEO COLLABORATION SYSTEM FOR VIDEO CONFERENCE MEETINGS

FIELD

This disclosure relates to the field of audio video meeting collaboration systems, and more specifically, to an integrated audio/video meeting collaboration system.

BACKGROUND

Current implementations require the use of multiple discrete components which are communicably coupled. Because the components are discrete, they often suffer from sub-par audio resulting from a lack of echo cancellation or microphones that are insufficient for a meeting room or suffer from sub-par video.

The current best practice for a meeting room audio/video system installation is to hire an integrator that can assemble the individual pieces, ensure excellent audio/video quality, and hide the cabling. This may unfortunately result in installation costs that may be as large as the cost of the equipment. As such, many customers may choose to use a web camera and audio from a display, resulting in a sub-par meeting experience.

In many office environments, meeting rooms are heavily booked, and optimizing the use of the meeting rooms is an important component of facilities management. With a built-in collaboration system, users may be able to determine from the on-screen display the state of the meeting room. This information may help them to finish their meeting on-time and leave the meeting room in time for the next user to access the room on schedule. The collaboration system may also help them start their meeting quickly and join into a scheduled web conference, which further optimizes the use of the meeting room. Currently, this functionality is handled with the user's laptop or via a computer located in the room. Neither of these systems provides a good indication that the end-of-meeting time is approaching, and this is particularly true of the user who is not looking directly at their display.

SUMMARY

In one embodiment, a system comprises at least one or more of a housing, an environment processor disposed in the housing, at least one presence detector disposed in the housing and coupled to the environment processor to detect presence within a predetermined distance of the meeting device, provides to the environment processor at least one presence detection signal based on the detected presence, wherein the environment processor turns on at least one meeting device component when the at least one presence detection signal is detected and at least one wireless transceiver is coupled to the environment processor to provide at least one wireless signal.

In another embodiment, a method comprises at least one or more of, detecting presence within a predetermined distance of the meeting device, providing, to an environment processor, at least one presence detection signal based on the detected presence and turning on at least one meeting device component by the environment processor when the at least one presence detection signal is detected, wherein the meeting comprises at least one of audio and video communication.

In a further embodiment, a non-transitory computer readable storage medium configured to store instructions that when executed causes a processor to perform at least one or more of: detecting presence within a predetermined distance of the meeting device, providing, to an environment processor, at least one presence detection signal based on the detected presence and turning on at least one meeting device component, by the environment processor, when the at least one presence detection signal is detected, wherein the meeting comprises at least one of audio and video communication.

DETAILED DESCRIPTION

Figure 1:
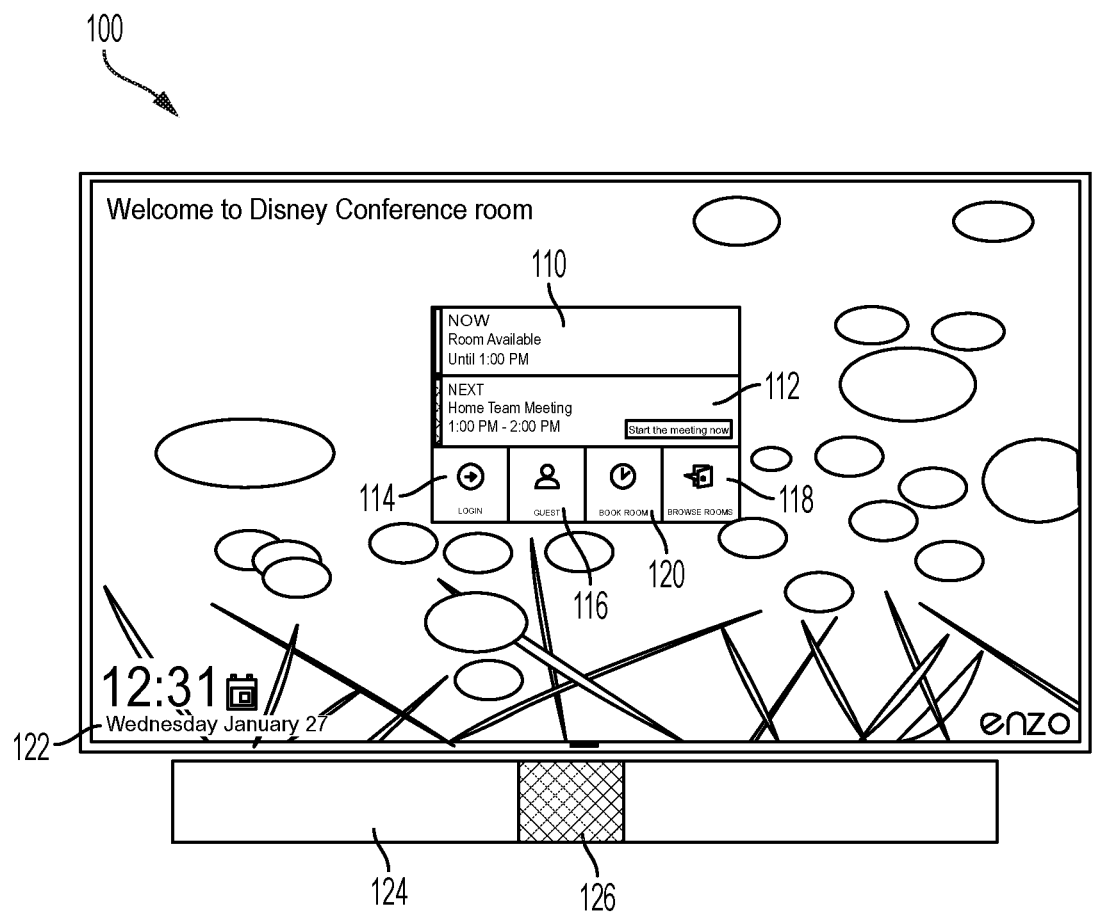
FIG. 1 illustrates a system with a display device suitable for practicing an embodiment of the disclosure.

It will be readily understood that the components of the present disclosure, as generally described and illustrated in the figures herein, may be arranged and designed in a wide variety of different configurations. Thus, the following detailed description of the examples of a method, apparatus, and system, as represented in the attached figures, is not intended to limit the scope of the disclosure as claimed, but is merely representative of selected examples of the disclosure.

The features, structures, or characteristics of the disclosure described throughout this specification may be combined in any suitable manner in one or more examples. For example, the usage of the phrases "examples", "some examples", or other similar language, throughout this specification refers to the fact that a particular feature, structure, or characteristic described in connection with the example may be included in at least one example of the present disclosure. Thus, appearances of the phrases "examples", "in some examples", "in other examples", or other similar language, throughout this specification do not necessarily refer to the same group of examples, and the described features, structures, or characteristics may be combined in any suitable manner in one or more examples.

Examples of the system provide a wireless or wired user device. The device may be a computer, laptop, mobile, wireless or cellular phone, a PDA, a tablet, a client or server or any device that contains a processor and/or memory, whether that processor or memory performs a function related to an example. The present disclosure may work with any device, such as a personal computer with a touch screen, a laptop with a touch screen, a personal computing tablet, a smartphone or any device with a processor and memory.

The present system provides meeting room audio/video in an integrated unit specifically designed for use in meeting rooms. Installation may be straightforward in that it does not require an integrator to install or configure the unit, thus reducing the cost of installation and maintenance.

The present system automates control of the display, such as turning the unit on when presence is detected or a device such as a computer, laptop, mobile, wireless or cellular phone, a PDA, a tablet, a client a server or any device that contains a processor and/or memory and having video is connected, and turning it off when the system is no longer in use. The system provides on-screen instructions that may be customized by the customer and which may assist non-technical users. When used with the built-in collaboration device, the system provides a time efficient way to start a meeting, access content, and join a web conference. The system additionally may tune itself to the room to provide echo cancellation.

Presence detection may be accomplished in a variety of ways such as motion detection through video or infrared, vocal detection, vibration detection, telepresence, RF detection, infrasonic detection, thermal detection and the like. The presence detection may turn on at least one meeting device component such as a video monitor that allows one click meeting start access to the system.

The system may have two processors, an environment processor which performs presence detection, signal detection and controls audio and video hardware and a collaboration processor which performs meeting schedule integration and connection to conferencing systems.

FIG. 1 shows an overview of the system in use. The display in FIG. 1 depicts the on screen display and controls for the system. The display depicts a portion of the controls for the system and comprises the current date and time 122, the current room schedule 110, the upcoming room schedule 112, login 114, guest sign in 116, browsing room schedules 118 and booking rooms 120. The present system is self-contained in the rectangular bar at the base and comprises speakers 124 and a central unit 126 containing processing, sensors, inputs and outputs.

The disclosed system may be utilized by customers wanting high-quality web conferences in their meeting rooms. The device may be utilized in conjunction with a room PC, a computer, laptop, mobile, wireless or cellular phone, a PDA, a tablet, a client a server or any device that contains a processor and/or memory. Integrating the camera, microphones, and speakers into an integrated unit may provide customers with an easily specified, installed, and maintained system. The system may additionally provide meeting room usage metrics such as display status, presence detector status, and the like. The metrics may be used by information technology (IT) and facilities departments to analyze how their meeting rooms are utilized.

The system may provide several levels of functionality, ranging from audio-only conferencing to a self-contained audio, video and document collaboration device that simplifies meeting start and web conferencing.

The system may provide a collaboration system in a box featuring fast meeting start and collaboration tools, along with conferencing audio and video. The system may provide universal serial bus (USB), high definition multimedia interface (HDMI), a short-range wireless service such as Bluetooth and the like for users to connect their own devices for conferencing in bring your own device (BYOD) set ups.

Figure 2:
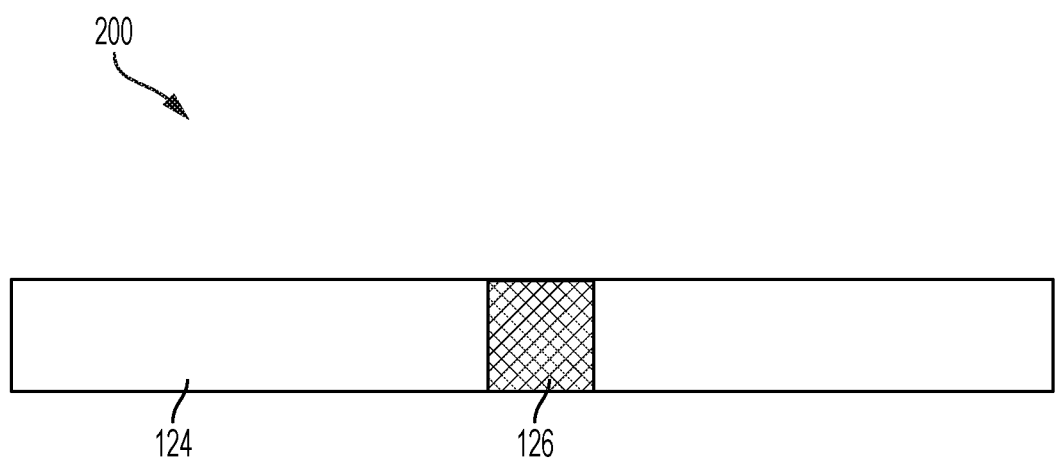
FIG. 2 illustrates a system suitable for practicing an embodiment of the disclosure.

The self-contained conferencing unit is shown without the display in FIG. 2 and comprises speakers 124 and a central unit 126 containing processing, sensors inputs and outputs. The central unit functionality and inputs and outputs will be discussed in FIGS. 3 and 4.

Figure 3:
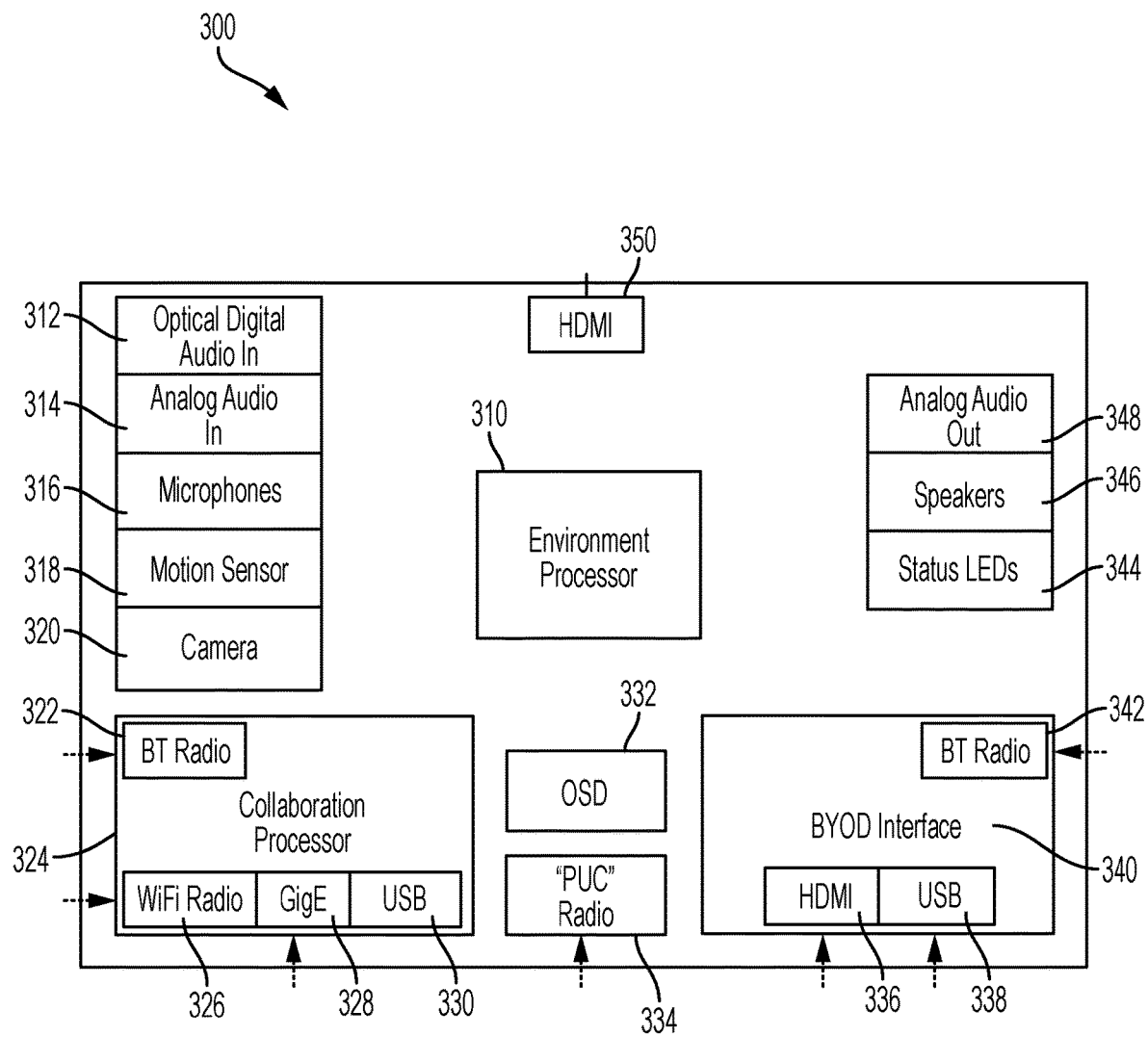
FIG. 3 illustrates a block diagram of the processing subsystems of the CPU of the system suitable for practicing an embodiment of the disclosure.
Figure 4:
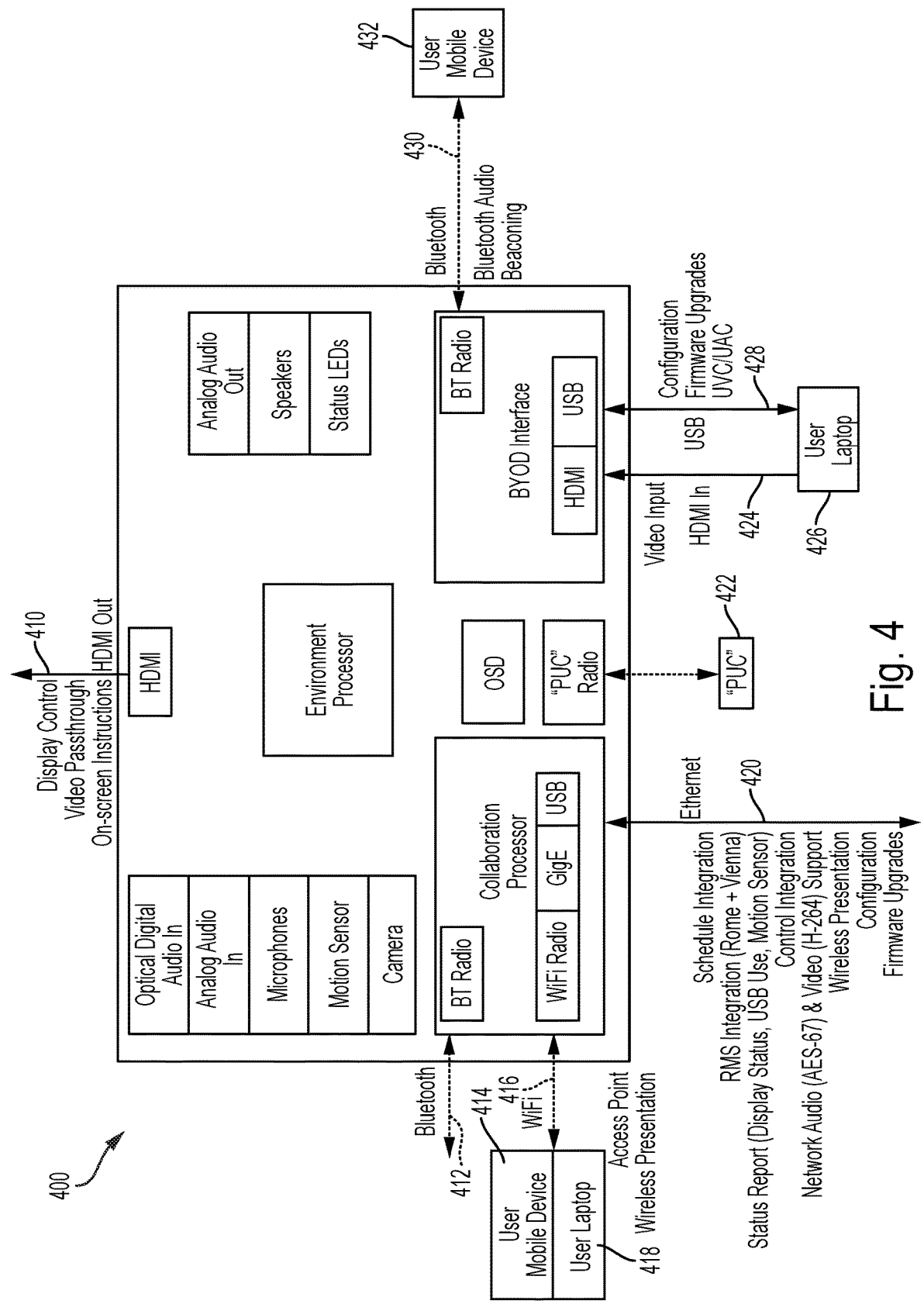
FIG. 4 illustrates example inputs and outputs of the system suitable for practicing an embodiment of the disclosure.

FIG. 3 will focus on the functionality of the central unit and FIG. 4 will focus on the inputs and outputs to and from the central unit. The central unit exterior being shown in FIGS. 1 and 2 as 126.

A remote control may provide the user with manual inputs used to control the system in a meeting. This may allow users to quickly and easily access functions of the system from a conveniently located device such as: volume up/down/mute, microphone mute, Bluetooth pairing, input switching, hang up and the like. The system may have a remote control having near field communication (NFC) support to facilitate Bluetooth pairing of a user's mobile device to the system. The remote control may be wired or wireless and support a long battery life, such as one year in normal use, and be able to provide information pertaining to the battery level to the system.

FIG. 3 depicts the processing core of the system 300. The processing core processes the inputs and outputs of the system and has an internal operating system run by environment processor 310.

Sensor inputs are shown as 312-320 and comprise at least one of an optical digital audio input 312, and analog audio input 314, microphones 316, a presence detector 318 and a video camera 320.

Some outputs of the system are shown as 344-350 and comprise at least one of status LEDs, discussed in detail later, speaker outputs 346, analog audio output 348, HDMI output 350 and the like.

Communications with the system OS run on a collaboration processor 324 comprise at least one of a short-range wireless service such as a Bluetooth radio connection 322, a WiFi radio connection 326 or the like, a GigE connection 328, a USB 330 and the like.

The system may also comprise an on screen display OSD 332 and a remote control link 334.

The system may additionally comprise a bring your own device (BYOD) interface 340 comprising at least one of an HDMI input 336, a USB input 338, a short-range wireless service such as Bluetooth radio input 342 and the like.

FIG. 4 depicts some of the communication channels to and from the central unit. The HDMI output 350 of FIG. 3 communicates an HDMI out signal 410 comprising display controls, video pass through and on screen instructions.

The short-range wireless service such as Bluetooth radio connection 322 of FIG. 3, the WiFi radio 326 or the like, may communicate via a Bluetooth signal 412, a WiFi signal 416 or the like to a mobile user device 414, a user laptop 418 or a computer, a PDA, a tablet, a client or server or any device that contains a processor and/or memory.

The GigE transceiver 328 of FIG. 3 may communicate via Ethernet signal 420. The remote control radio 334 of FIG. 3 may communicate via a remote signal 422 or the like to the remote.

The BYOD interface 340 of FIG. 3 may communicate via HDMI input 424 to the HDMI interface 336 of FIG. 3, by USB signal 428 to the USB interface 338 of FIG. 3 to a computer, laptop, mobile, wireless or cellular phone, a PDA, a tablet, a client or server or any device that contains a processor and/or memory 426 or the like. Additionally the short-range wireless service such as Bluetooth radio 342 of FIG. 3 may communicate via Bluetooth signals 430 with a user mobile device 432 or any device which may communicate wirelessly via a Bluetooth signal.

The system may be operated and configured using an internal user interface and may enable the microphones, speakers, and camera based on the operation of the access software, in essence, if an interactive communication platform launches the camera, then the system may not attempt to override or alter the behavior of interacting software.

Use Case 1

In an example first use case, a meeting attendee may start a phone call or web conference on their mobile device prior to entering the meeting room. Upon entering the meeting room, the attendee may want to use the system in order to allow additional people in the meeting room to participate in the call. The user may select the Bluetooth settings on their mobile device, search for devices to connect to, find the system, and connect to it. At this point, the microphones and speakers in the systems may be used for the conference call on the user's mobile device.

Figure 5:
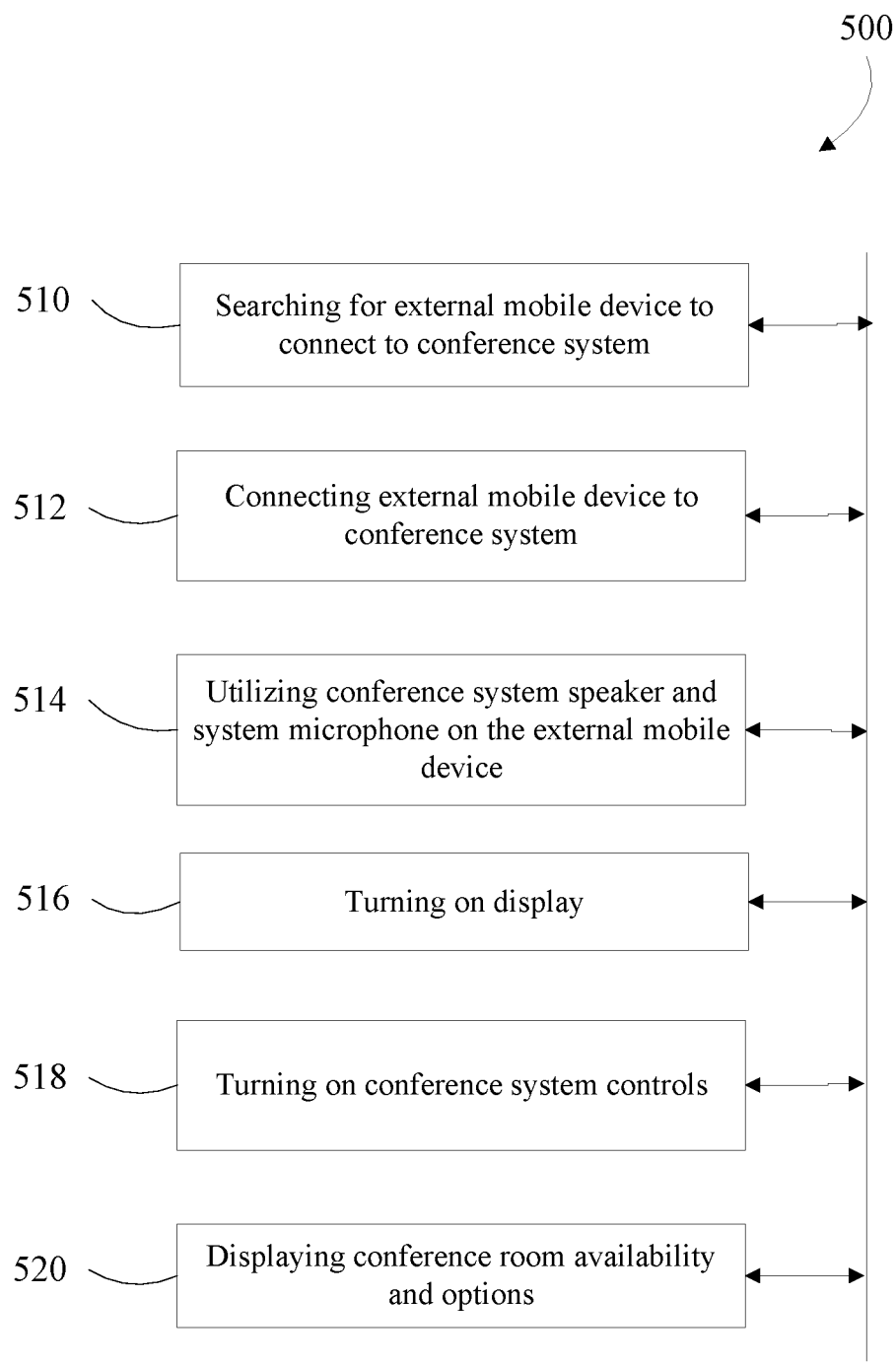
FIG. 5 illustrates a first example logic flow in accordance with one embodiment of the disclosure.

FIG. 5 displays the logic for the first use case. The logic may comprise searching 510 for an external mobile device to connect to conference system, in FIG. 3 this connection may be made by either the operating system run on a collaboration processor 324 through a short-range wireless service such as a Bluetooth radio, WiFi radio or the like, GigE or USB connection or through the BYOD interface 340 using the Bluetooth radio interface, HDMI, USB connection or the like. Then connecting 512 the external mobile device to the conference system shown in FIG. 2 as 200. The logic provides utilizing 514 a conference system speaker shown in FIG. 2 as 124 and a system microphone on the external mobile device, turning on 516 the display, shown in FIG. 1, turning on 518 the conference system controls and displaying 520 the conference room availability and options shown in FIG. 1 as 110, 112.

Use Case 2

In an example second use case the time it takes to start a meeting is minimized.

In this example, a meeting attendee may enter a meeting room and the presence detector on the system, 318 FIG. 3 may detect the presence of a person, turns on the display, shown in FIG. 1, and command the system to switch on. Once the display is on, the user may view information pertaining to room availability and options shown in FIG. 1 as 110, 112. The user may then choose to start a meeting, book the room, or book a nearby room. Once the internal operating system is accessed, web conferencing may utilize the system hardware shown in FIG. 1 to provide audio visual (AN) interaction.

Figure 6:
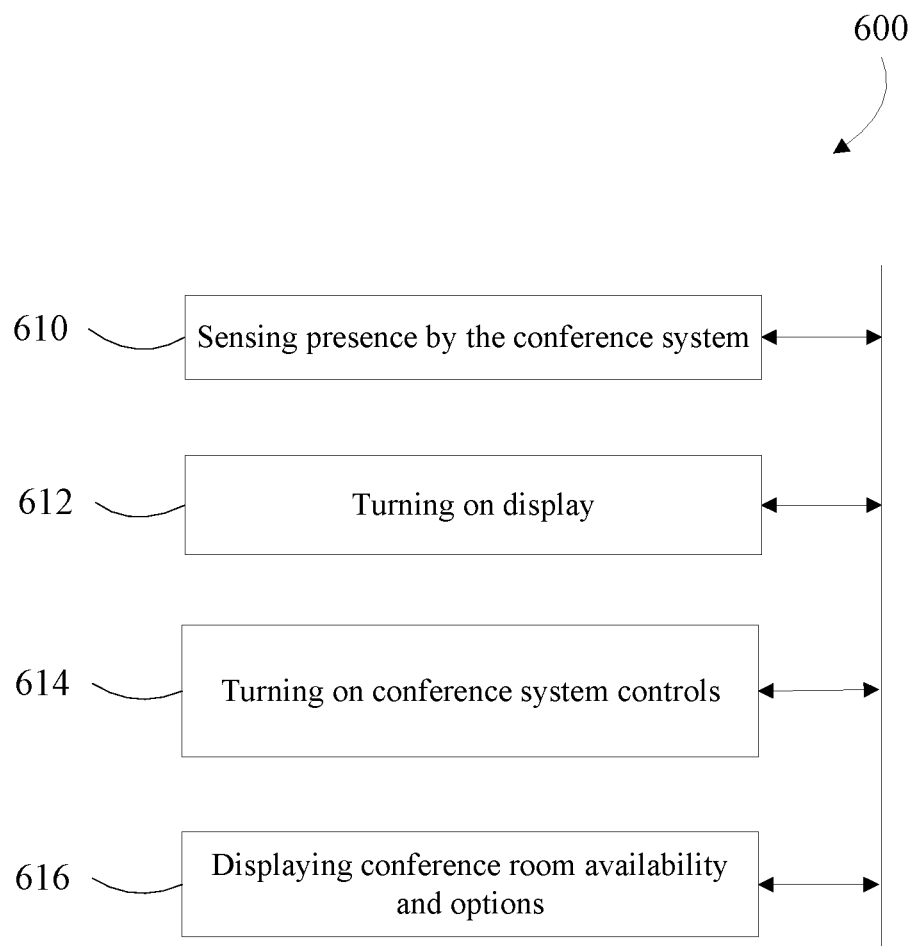
FIG. 6 illustrates a second example logic flow in accordance with one embodiment of the disclosure.

The second use case logic is depicted in FIG. 6 and comprises sensing presence 610 by the conference system, shown in FIG. 3 as 318, turning on 612 the display shown in FIG. 1, turning on 614 the conference system controls and displaying 616 conference room availability and options shown in FIG. 1 as 110, 112.

Use Case 3

In an example third use case a user may bring a laptop or other mobile communications device into a room and wish to use the mobile communications device for conferencing.

In this example a meeting attendee may enter a meeting room with a device such as a laptop. The presence detector, 318 FIG. 3, on the system detects the presence of a person, turns on the display, FIG. 1, and commands the system to switch on. If the user wants to access a web conference using the laptop, they may connect the USB, HDMI cables and the like to the laptop. Upon detecting connections, BYOD Interface 340 FIG. 3, the system may switch the video and USB over to the laptop connection so that the user may access the display, microphones, speakers, and cameras via their laptop. The external communications device may comprise a mobile user device 414, a user laptop 418 or a computer, a PDA, a tablet, a client a server or any device that contains a processor and/or memory.

Figure 7:
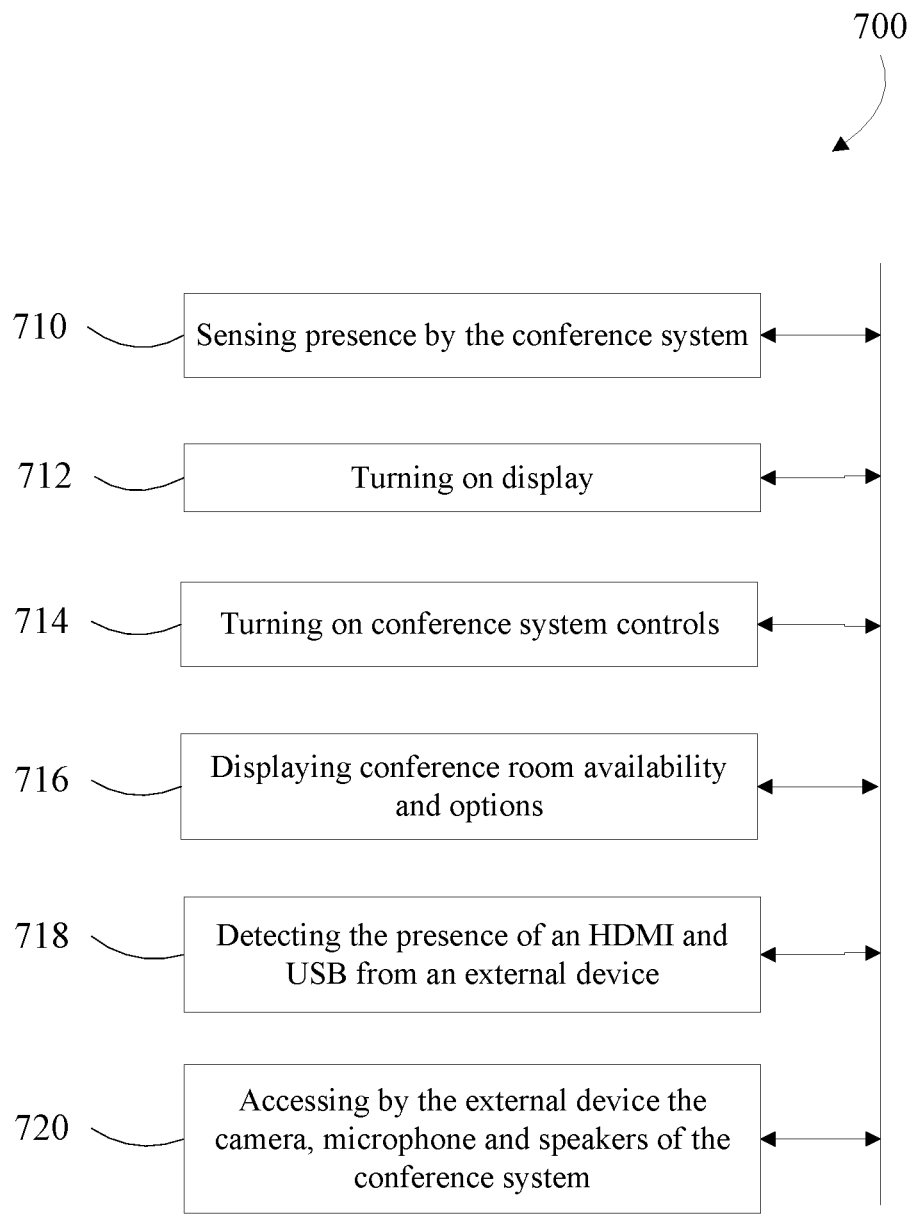
FIG. 7 illustrates a third example logic flow in accordance with one embodiment of the disclosure.

The third use case logic is depicted in FIG. 7 comprising sensing presence 710 by the conference system, shown in FIG. 3 as 318, turning on 712 the display, shown in FIG. 1 and turning on 714 the conference system controls. The third use case also comprises displaying 716 the conference room availability and options, shown in FIG. 1 as 110, 112, detecting 718 the presence of an HDMI and USB from an external device, shown in FIG. 3 as 336 and 338, and accessing 720 a microphone, and/or camera and/or display of the conference system.

After the meeting, the user may disconnect the laptop, at which point the system may switch the HDMI and USB connections back over to the internal operating system.

Figure 8:
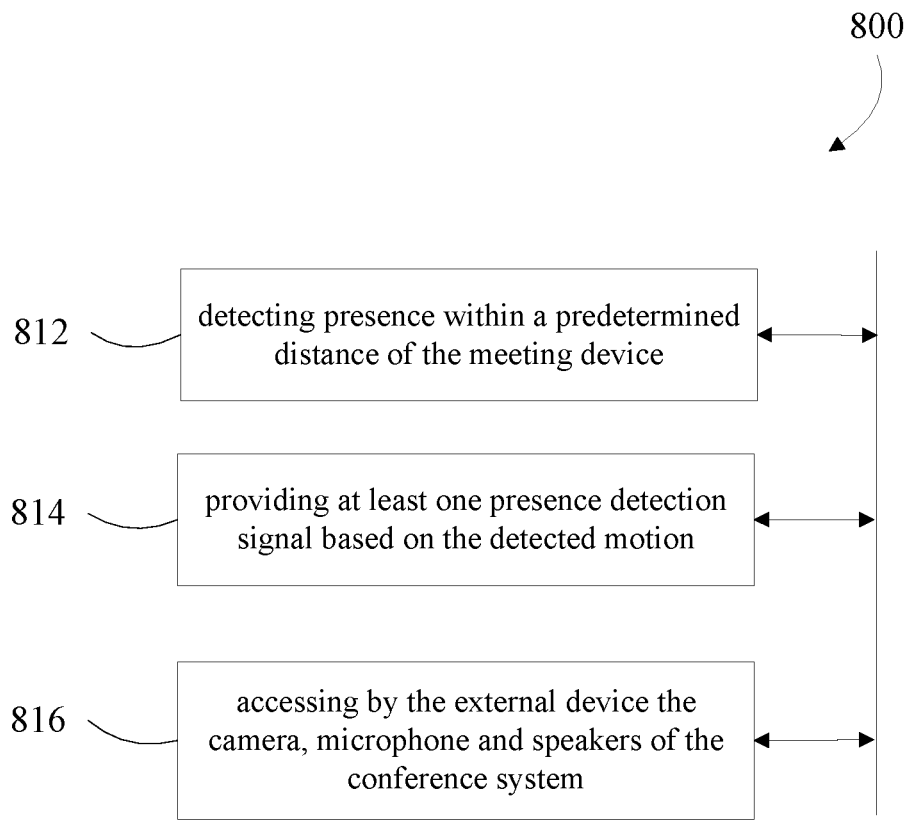
FIG. 8 illustrates an example method in accordance with one embodiment of the disclosure.

FIG. 8 depicts an example method, comprising, detecting 812 presence within a predetermined distance of the meeting device utilizing a presence detector. The system may provide 814 at least one presence detection signal based from the presence detector of the detected presence to the environment processor in the meeting device. At which point the meeting device may turn on at least one meeting device component 816 when the at least one presence detection signal is detected and accessing a microphone, and/or camera and/or display of the conference system. The meeting may comprise at least one of audio and video communication.

Figure 9:
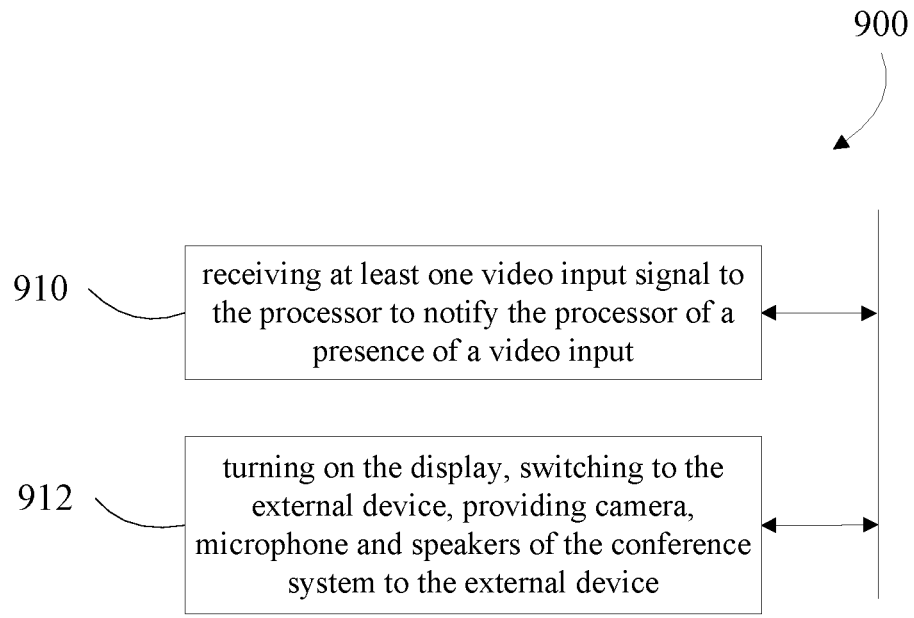
FIG. 9 illustrates a first example method working in conjunction with the method of FIG. 8 in accordance with one embodiment of the disclosure.

FIG. 9 depicts an example method in conjunction with the method shown in FIG. 8 further comprising, receiving 910 at least one video input signal to the environment processor to notify the environment processor of a presence of a video input and turning on at least one meeting device component 912 when the at least one video input signal is detected. In this example the display may be turned on, and provide the camera, microphone and speakers of the conference system to the user's device.

Figure 10:
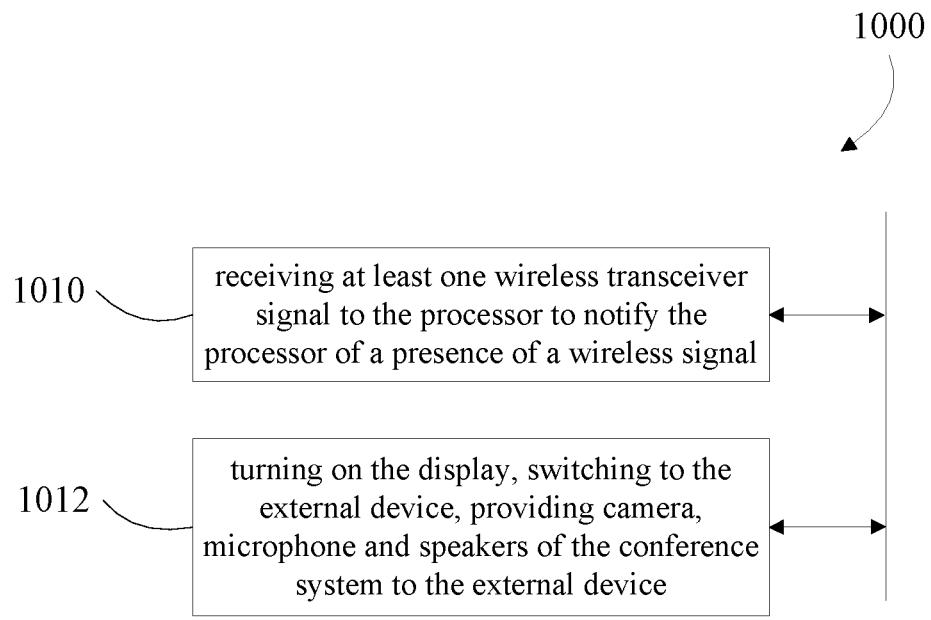
FIG. 10 illustrates a second example method working in conjunction with the method of FIG. 8 in accordance with one embodiment of the disclosure.

FIG. 10 depicts an example method in conjunction with the method shown in FIG. 8 further comprising, receiving at 1010 least one wireless transceiver signal to the environment processor to notify the environment processor of a presence of a wireless signal and turning on at least one meeting device component 1012 when the at least one wireless transceiver signal is detected. In this example the display may be turned on, and provide the camera, microphone and speakers of the conference system to the user's device.

Figure 11:
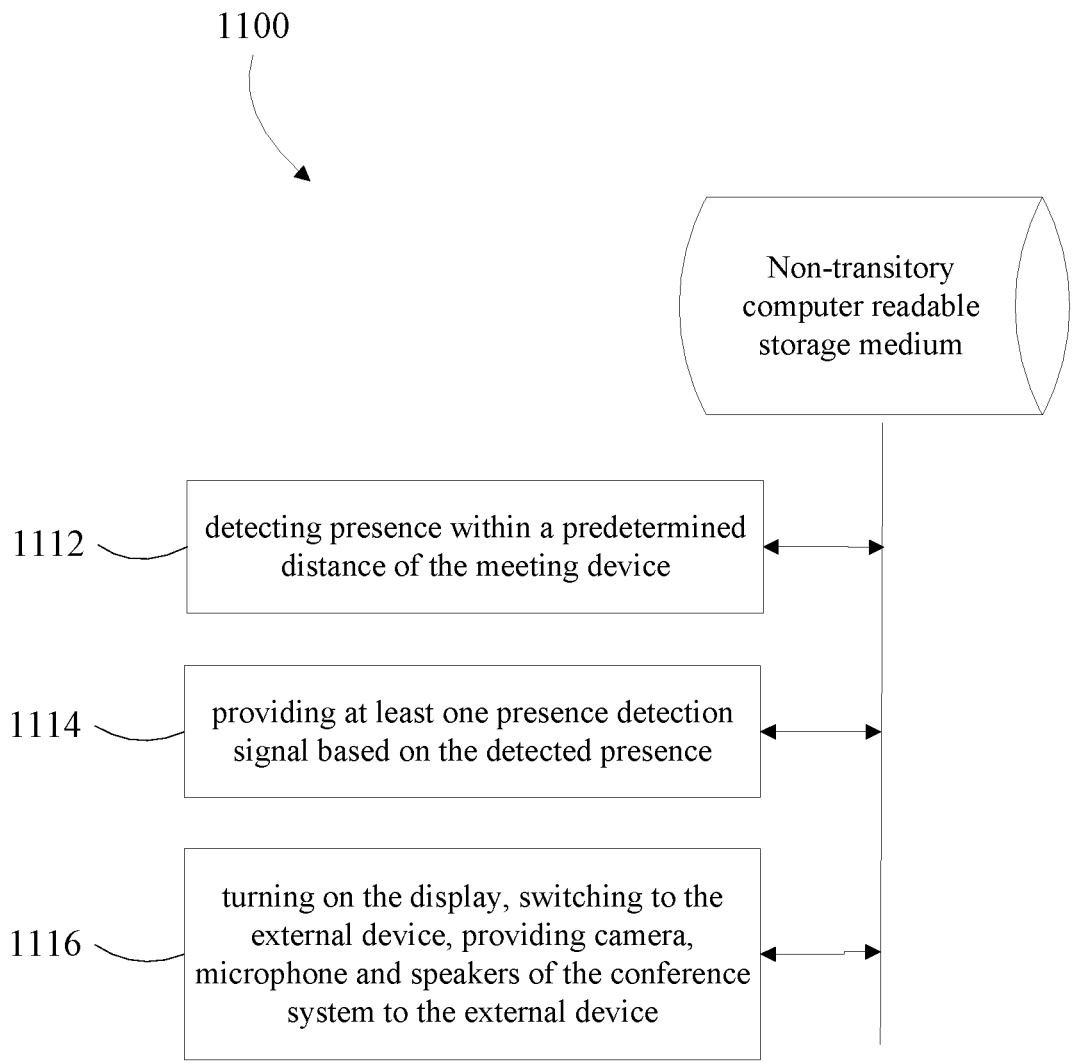
FIG. 11 illustrates an example non-transitory computer readable storage medium in accordance with one embodiment of the disclosure.

FIG. 11 depicts a non-transitory computer readable storage medium configured to store instructions that when executed cause a processor to perform detecting 1112 presence within a predetermined distance of the meeting device. The processor may also perform providing 1114 at least one presence detection signal based on the detected presence and turning on at least one meeting device component 1116 when the at least one presence detection signal is detected. The meeting may comprise at least one of audio and video communication.

Central Processing Unit (CPU)

The system comprises a subassembly, 300 of FIG. 3, (CPU, random access memory (RAM), flash, wireless radios) capable of running the internal operating system run by an environment processor (310 FIG. 3) and applications.

Video

The system may support resolutions at least as high as 4K, and may have one or more HDMI inputs and outputs.

If an HDMI output is detected, the system may send audio and video from the selected HDMI signal, from the HDMI input or from the internal operating system, to the HDMI output.

In one example configuration, the system may be switched to the internal operating system output unless a source is connected to the HDMI input, in which case the system may switch to the HDMI input and remain there until the source on the HDMI input is removed.

The system may support consumer electronics control (CEC) of the connected display to support power on, power off, switch-to-me, display volume, mute and the like. The system may have a setting to enable/disable CEC so that the system may hand over display controls in circumstances where either system control is not desired or the system control is operating in unexpected ways due to the nature of the display. The system may receive commands via the internal operating system, to control the display via CEC.

Camera

The system camera may have a minimum horizontal field-of-view of 120°, may support video resolutions up to 1080p, may have a built-in mechanical shutter that is electronically operated and may be able to be operated via serial port commands. The system camera may provide a visible indication that the shutter is closed so that users may be informed as to why they do not have any outgoing video. In the event that the system shutter is closed, the microphones on the system may be disabled such as a mechanical microphone disconnect or the like.

The state of the system shutter may be made available to the internal operating system so that it may present a message to users pertaining to the state of the shutter. In one embodiment the system camera may have a mechanical pan/tilt adjustment that allows the camera to be adjusted once it is installed. The system camera may be adjustable horizontally ±20°, may be adjustable vertically ±15°, and may support USB video class (UVC) 1.5 and hardware H.264 video encode.

Status Light Emitting Diodes (LEDs)

The system may have LEDs that are used by the internal operating system software to indicate a meeting status. The status LEDs may be able to be turned on, off, or pulsed, e.g. fading in and out. The status LED brightness levels may be configurable by the administrator or controllable by the internal operating system software. The status LEDs may also indicate microphone status, Bluetooth status, camera status and the like.

Networking

The system may have Ethernet connectivity, connecting and managed directly by the internal operating system.

Control and Monitoring (CTRL)

The system may support integration with a controller and may have control and monitoring capabilities of the system via RS-232 matching those available through USB. The system may be controlled by the internal operating system via controller commands to the internal operating system such as; Standby state, volume up/down/mute, mic mute/unmute, Bluetooth state (disconnect, pairing), meeting status LED state (on/off/pulse, color), display state (on/off/switch-to-me), source selection (direct select/toggle), Bluetooth radio (off, on—power level), shutter open/close, if the shutter is electronically controlled, and the like.

The system may be able to be monitored via the USB and RS-232 ports; standby state, volume state, Bluetooth state, camera state, camera shutter state, microphone state, USB state, HDMI input state, HDMI output state, display state, presence, selected source and the like.

Triggers (TRIG)

The system may have automation responses to trigger signals and may be configurable via a commissioning tool. This trigger information may also be available for metric gathering.

If a presence detected trigger is sensed, the system may take no action or turn on the display. The presence detected trigger may have a delay setting that triggers on multiple presence events over a period of time.

If an HDMI connected trigger is sensed, the system may take no action or turn on the display. The HDMI Connected trigger may have delay setting that senses that the cable is connected for a period of time in order for the trigger to occur.

If a presence inactivity trigger is sensed the system may take no action or turn off the display. The presence inactivity trigger may have a delay setting that measures when the cable is connected for longer than a threshold period of time to trigger.

If an HDMI disconnected trigger is sensed the system may take no action or turn off the display. The HDMI disconnected trigger may have delay setting that may be used to measure when a cable is disconnected for longer than a threshold period of time to trigger.

Internal Operating System Drivers (RDRV)

The system may include a Windows driver for the internal operating system that allows the internal operating system to operate various aspects of the system, including speakers, microphones, camera, status LEDs and the like. The driver for the internal operating system may be able to control and monitor different aspects of the system so that the internal operating system may report these via a remote management suite (RMS) and/or simple network management protocol (SNMP) or via a future analytics tool.

Presence Detector

The system may have presence sensing capability so that the display may be turned on when presence is detected, presence metrics may be collected, etc. The system presence sensing technology may have some option to tune it to the individual meeting room. For example, tuning may be necessary if the system is pointed at a doorway or a window or if there are multiple systems side-by-side. The system presence sensing technology may be disabled.

Furthermore, the system may comprise a built-in collaboration system that allows for software integration to a scheduling system and to web conferencing platforms. These functions, when integrated together, allow a technology manager to install the system in a meeting location and provide non-technical users with access to excellent audio and video for their meeting in a simple-to-use package.

The system may simplify setting up and attendance at a meeting location. The system may provide control over the display, which may turn on automatically when presence is detected or when the user connects a mobile device to the system such as a laptop, a room PC, a computer, a PDA, a tablet, a client a server or any device that contains a processor and/or memory. In the case where the collaboration system is utilized, the meeting location user may be notified when an end of meeting time is reached, which may allow for more efficient use of meeting rooms.

The system may allow for collaborative functionality without the need of custom programming or a knowledgeable audio/video installer.

The operations of a method or algorithm described in connection with the examples disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example a network element, which may represent any of the above-described network components, etc.

Although an exemplary example of at least one of the system, method, and non-transitory computer readable medium of the present disclosure has been illustrated in the accompanied drawings and described in the foregoing detailed description, it will be understood that the application is not limited to the examples disclosed, and is capable of numerous rearrangements, modifications, and substitutions without departing from the spirit or scope of the disclosure as set forth and defined by the following claims. For example, the capabilities of the systems can be performed by one or more of the modules or components described herein or in a distributed architecture.

While preferred examples of the present disclosure have been described, it is to be understood that the examples described are illustrative only and the scope of the disclosure is to be defined solely by the appended claims when considered with a full range of equivalents and modifications (e.g., protocols, hardware devices, software platforms etc.) thereto.

What is claimed is:

1. A meeting device, comprising:
   a housing;
   an environment processor disposed in the housing;
   at least one presence detector disposed in the housing and coupled to the environment processor to detect presence within a predetermined distance of the meeting device, provides to the environment processor at least one presence detection signal based on the detected presence, wherein the environment processor turns on at least one meeting device component in response to the presence detection signal;
   at least one wireless transceiver coupled to the environment processor to provide at least one wireless signal; and
   a communication interface coupled to the environment processor and configured to physically connect with an external mobile device,
   wherein, in response to detecting the external mobile device being plugged in to an input port of the communication interface, the environment processor is configured to automatically switch control of an audio device and a video device coupled to the meeting device from an operating system of the meeting device to the external mobile device, wherein the switch of control enables audio and video played on the external mobile device to pass through the meeting device to the audio and video devices coupled to the meeting device, and
   in response to detecting the external mobile device being unplugged from the input port of the communication interface, the environment processor is configured to automatically switch control of the audio device and the video device back to the operating system of the meeting device.

2. The meeting device of claim 1 further comprising:
   at least on video input coupled to the environment processor to provide at least one video input signal;
   an adjustable video camera disposed in housing and electrically coupled to the environment processor;
   at least two speakers disposed in the housing and electrically coupled to the environment processor;
   at least one microphone disposed in the housing and electrically coupled to the environment processor;
   at least one video output electrically coupled to the environment processor; and
   at least one network transceiver coupled to the environment processor.

3. The meeting device of claim 1 further comprising a collaboration processor electrically connected to the environment processor, that detects a scheduled meeting and in conjunction with the environment processor allows a one click meeting start and wherein, the at least one presence detection signal triggers a collection of presence metrics.

4. The meeting device of claim 1 wherein, a lack of the at least one presence detection signal for a predetermined time period triggers a presence inactivity state.

5. The meeting device of claim 2 wherein the at least one video input transfers the at least one video input signal to the environment processor to notify the environment processor of the at least one video input signal, and the environment processor begins the meeting when the at least one video input signal is detected.

6. The meeting device of claim 5 wherein, the presence of the at least one video input signal triggers a collection of presence metrics.

7. The meeting device of claim 1 wherein the at least one wireless transceiver transfers the at least one wireless transceiver signal to the environment processor to notify the environment processor of the at least one wireless transceiver signal, and the environment processor begins the meeting when the at least one wireless transceiver signal is detected.

8. The meeting device of claim 7 wherein, the presence of the at least one wireless transceiver signal triggers a collection of presence metrics.

9. The meeting device of claim 1 wherein at least one of a standby state, a volume, a microphone state, a meeting status, a display state, an audio visual source and a Bluetooth state is controllable and monitorable by the environment processor.

10. A method, comprising:
    detecting presence within a predetermined distance of a meeting device;
    providing, to an environment processor, at least one presence detection signal based on the detected presence;
    turning on, by the environment processor, at least one meeting device component when the at least one presence detection signal is detected, wherein the meeting comprises at least one of audio and video communication;

physically connecting to an external mobile device via a communication interface that is coupled to the environment processor, wherein, in response to detecting the external device being plugged in to an input port of the communication interface, the method further comprises automatically switching, via the environment processor, control of an audio device and a video device coupled to the meeting device from an operating system of the meeting device to the external mobile device, wherein the switch of control enables audio and video played on the external mobile device to pass through the meeting device to the audio and video devices coupled to the meeting device, and in response to detecting the external mobile device being unplugged from the input port of the communication interface, the method further comprises automatically switching, via the environment processor, control of the audio device and the video device back to the operating system of the meeting device.

11. The method of claim 10 further comprising detecting by a collaboration processor a scheduled meeting and in conjunction with the environment processor allows a one click meeting start and wherein, the at least one presence detection signal triggers a collection of presence metrics.

12. The method of claim 10 wherein, a lack of the at least one presence detection signal for a predetermined time period triggers a presence inactivity state.

13. The method of claim 10, further comprising:

receiving at least one video input signal to the environment processor to notify the environment processor of a video input; and turning on at least one meeting device component, by the environment processor, when the at least one video input signal is detected.

14. The method of claim 13 wherein, the presence of the video input triggers a collection of presence metrics.

15. The method of claim 10, further comprising:

receiving at least one wireless transceiver signal to the environment processor to notify the environment processor of a wireless signal; and turning on at least one meeting device component, by the environment processor, the meeting when the at least one wireless transceiver signal is detected.

16. The method of claim 15 wherein, the presence of the wireless signal triggers a collection of presence metrics.

17. A non-transitory computer readable storage medium configured to store instructions that when executed cause an environment processor to perform:

detecting presence within a predetermined distance of the meeting device;

providing, to the environment processor, at least one presence detection signal based on the detected presence;

turning on at least one meeting device component, by the environment processor, when the at least one presence detection signal is detected, wherein the meeting comprises at least one of audio and video communication; and physically connecting to an external mobile device via a communication interface that is coupled to the environment processor, wherein, in response to detecting the external mobile device being plugged in to an input port of the communication interface, the method further comprises automatically switching, via the environment processor, control of an audio device and a video device coupled to the meeting device from an operating system of the meeting device to the external mobile device, wherein the switch of control enables audio and video played on the external mobile device to pass through the meeting device to the audio and video devices coupled to the meeting device, and in response to detecting the external mobile device being unplugged from the input port of the communication interface, the method further comprises automatically switching, via the environment processor, control of the audio device and the video device back to the operating system of the meeting device.

18. The non-transitory computer readable storage medium instructions of claim 17 further comprising detecting by a collaboration processor a scheduled meeting and in conjunction with the environment processor allows a one click meeting start and wherein, the at least one presence detection signal triggers a collection of presence metrics.

19. The non-transitory computer readable storage medium instructions of claim 17, further comprising:

receiving at least one video input signal to the environment processor to notify the environment processor of a video input; and turning on at least one meeting device component in response to the presence detection signal.

20. The non-transitory computer readable storage medium instructions of claim 17 further comprising:

receiving at least one wireless transceiver signal to the environment processor to notify the environment processor of a wireless signal; and turning on at least one meeting device component, by the environment processor when the at least one wireless transceiver signal is detected.

* * * * *